United States Patent [19]
Förster et al.

[11] Patent Number: 6,041,415
[45] Date of Patent: Mar. 21, 2000

[54] FIELD BUS ARRANGEMENT HAVING INDEPENDENT POWER CIRCUITS AND CONTROL CIRCUITS

[75] Inventors: Karl-Heinz Förster, Commack; Robert Conde, Coram, both of N.Y.

[73] Assignee: Festo AG & Co, Esslingen, Germany

[21] Appl. No.: 08/946,400

[22] Filed: Oct. 7, 1997

[30] Foreign Application Priority Data

Oct. 11, 1996 [DE] Germany ............... 296 17 686 U

[51] Int. Cl.⁷ .................. G06F 1/26; H02J 13/00
[52] U.S. Cl. ............................ 713/300; 307/38
[58] Field of Search .................. 395/750.01, 311; 307/38, 115, 126, 85, 43, 140; 361/601, 683, 99, 120, 189, 190; 364/492, 483, 147; 713/300, 310, 324; 710/131; 363/50; 323/271; 340/644, 652

[56] References Cited

U.S. PATENT DOCUMENTS

| | | | |
|---|---|---|---|
| 4,027,208 | 5/1977 | Look | 361/194 |
| 4,055,772 | 10/1977 | Leung | 307/10.1 |
| 4,312,035 | 1/1982 | Greene | 340/825.22 |
| 4,574,355 | 3/1986 | Beatty et al. | 364/528.3 |
| 4,760,276 | 7/1988 | Lethellier | 307/18 |
| 4,902,901 | 2/1990 | Pernyeszi | 250/551 |
| 5,467,241 | 11/1995 | Sugitani et al. | 361/63 |
| 5,519,636 | 5/1996 | Stoll et al. | 364/528.17 |
| 5,696,965 | 12/1997 | Ehlers et al. | 364/528.21 |

*Primary Examiner*—Gopal C. Ray
*Attorney, Agent, or Firm*—Hoffman & Baron, LLP

[57] ABSTRACT

A field bus arrangement comprising at least one field bus station adapted to be connected with a serial field bus and furthermore at least one load controlled by way of a control output of the field bus station, the load being connected with a power supply line provided in addition to the lines of the field bus. The controlled switch is able to be actuated via the control output of the field bus station. The power circuits are completely decoupled, this meaning for example that the load can be switched off both by way of the field bus station itself and also by switching off the power supply line.

11 Claims, 1 Drawing Sheet

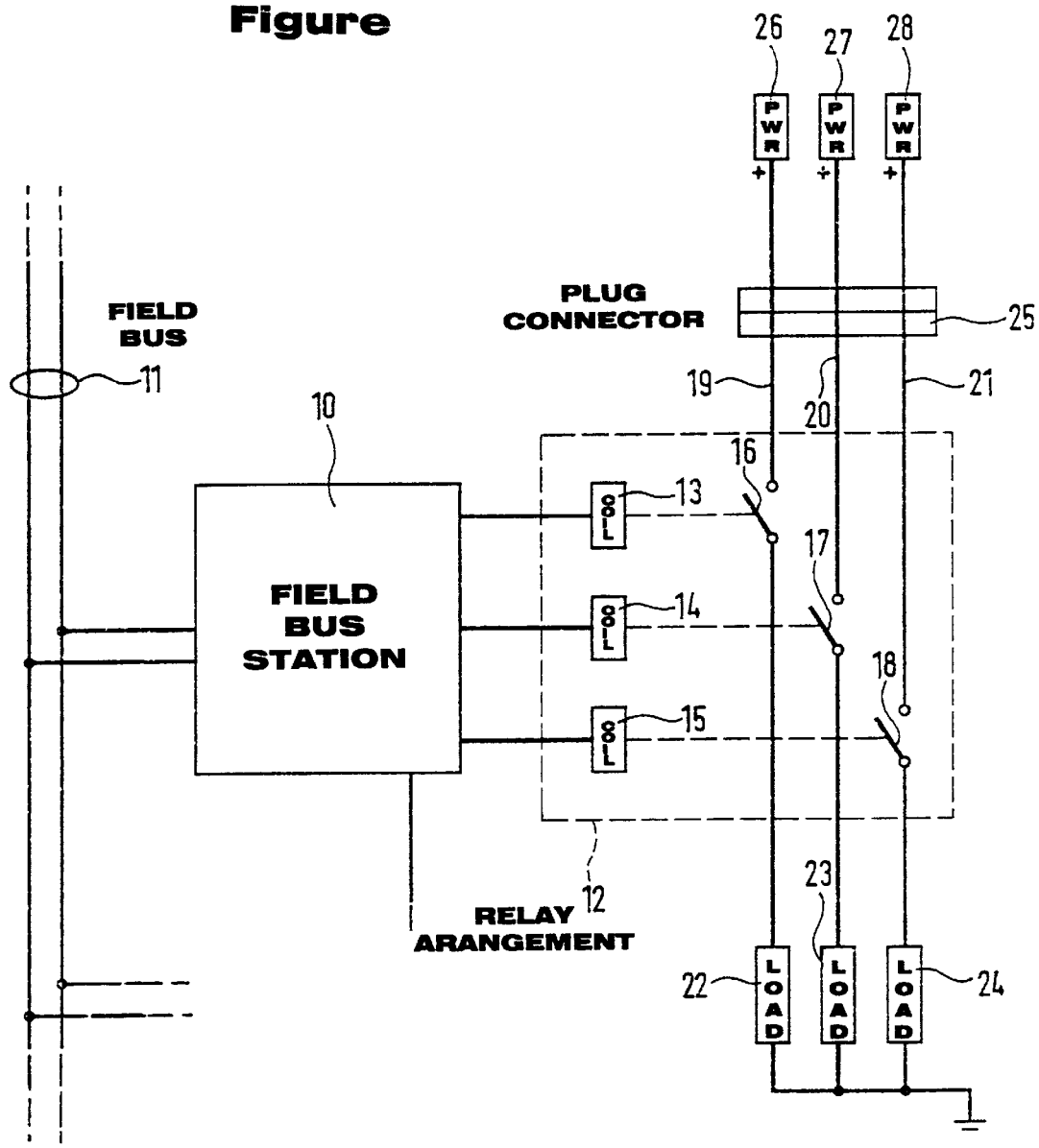

FIELD BUS ARRANGEMENT HAVING INDEPENDENT POWER CIRCUITS AND CONTROL CIRCUITS

BACKGROUND OF THE INVENTION

1. Field of the Invention

The invention relates to a field bus arrangement comprising at least one field bus station adapted to be connected with a serial field bus and at least one load adapted to be controlled by way of a control output of the field bus station.

2. Description of the Prior Art

Field bus arrangements for the serial control of spatially separate loads and load arrangements via field bus stations from a central control unit have been proposed in many different designs and variations, see for example the German patent publication 4,226,682 A, the German patent publication 3,631,477 A, the British patent publication 2,123,589 B or the periodical Elektronik 11, 3.6.1983, "Das lokale SP-Netzwerk", pages 73 through 78. In the case of the known arrangements in each case several field bus stations (or field bus nodes) are connected with the field bus consisting of customarily two or three lines by way of a central control unit. The same transmits serial data telegrams along the field bus and communicates via an address comprised in the data telegram with the field bus station assigned in the data telegram. In accordance with the control commands received such field bus station then directly controls, by way of control outputs, one or more of the connected loads. By way of the field bus there is then a transmission both of the control signals and also of the necessary electrical power for the supply of the field bus stations and for direct control of the loads. This means that there is on the one hand the need for elaborate and expensive field bus stations and on the other hand there is the danger of spurious activation of loads owing to defective data telegrams in the field bus, something which is unacceptable for many applications having high requirements as regards safety standards.

OBJECTS AND SUMMARY OF THE INVENTION

One object of the invention is accordingly to create field bus arrangements with simpler and less expensive field bus stations, in the case of which the possibility of complete decoupling of the power circuits exists.

In order to achieve these and/or other objects appearing from the present specification, claims and drawings, in the present invention the at least one load is connected by way of a controlled switch with a power supply line provided in addition to the lines of the field bus and the controlled switch is able to be operated by the control output of the field bus station.

In the design in accordance with the invention the lines of the field bus serve exclusively for data transmission, and in the field bus station itself no device for decoupling the power supply and data information is required. This leads to the desired simple and inexpensive field bus stations. In this respect for the field bus station itself it is irrelevant how large the current or voltage requirement of the load is. The power circuits are completely decoupled, that is to say for example that the load may be switched off both by way of the field bus station itself as well as by switching off the power supply line. This means that there is an inexpensive and reliable design. A further advantage is that the different loads may be connected with their own respective power supply lines and nevertheless may be controlled by way of a common field bus station.

The features recited in the dependent claims relate to advantageous further developments of and improvements in the field bus arrangement as claimed in claim 1.

It is preferred for a plurality of loads to be controlled via a corresponding number of control outputs of the field bus station, in which respect more particularly several power supply lines, which are able to be supplied with power independently from each other, are connected with the controlled switches. This leads to a complete decoupling of the loads from one another and from the field bus station. The power supply may be switched off independently from the field bus station, there being the advantageous possibility that a plurality of power supply lines may be switched off independently from each other so that for instance one load may not be switched on by switching off the corresponding power supply line even in the event of there being a spurious signal from the field bus station. The field bus structure is completely separated or isolated from the power supply side for the loads. This also provides the advantage that a plurality of loads, which require different power supply voltages, may be controlled by one field bus station.

The at least one power supply line is conveniently extended by way of a releasable plug connection with the loads so that by this provision as well a simple interruption, as for example a safety interruption, the supply voltage may be reached in order to switch off the load with a particularly high degree of reliability.

The at least one controlled switch is preferably designed in the form of a relay and more especially a reed relay, or as an opto-coupler switch.

By integration of the at least one controlled switch in the housing of the field bus station the amount of space required is kept extremely low. Nevertheless adaption to an extremely wide range of customer requirements is possible.

The field bus arrangement in accordance with the invention is more particularly suitable for the control of a plurality of pneumatic valves.

One embodiment of the invention is represented in the drawing and will be described in the following specification.

BRIEF DESCRIPTION OF THE DRAWINGS

The FIGURE is a block circuit diagram of a field bus station, connected with a field bus, for the control of three loads.

DETAILED DESCRIPTION OF THE PREFERRED EMBODIMENTS

The embodiment of the invention, illustrated in the single FIGURE, of a field bus arrangement comprises a field bus station 10, also termed a field bus node, which is connected with a field bus 11 comprising two lines. Lines are employed to diagrammatically indicate the possibility of connection of further field bus stations. Such a field bus 11 is also controlled in the initially mentioned prior art in an inherently known manner by means of a central station which is not illustrated. In principle it would also be possible to have, instead of one central station, one or more field bus stations in control of the others and adapted to perform control functions on same. The number of the lines of the field bus is able to be varied within certain limits and it is for example possible to provide three field bus lines as well.

On the output side the field bus station controls a relay arrangement 12, which comprises three relays. Accordingly three relay coils 13 through 15 drive three relay switches 16 through 18. These relay switches 16 through 18 are placed on power supply lines 19 through 21, which lead to three diagrammatically illustrated loads 22 through 24, such loads being for instance electrically driven pneumatic valves. Such valves have their respectively second terminal connected with ground or respectively with the respectively other pole of the power supply. On the other hand the power supply lines 19 through 21 lead by way of plug connector 25 to three power supply sources 26 through 28, where they are connected with the respective positive pole. The supply power sources 26 through 28 may also be completely decoupled from one another, that is to say the negative or ground terminal of the loads 22 through 24 can also be separately returned to the associated power supply source.

In a simpler design it is naturally also possible for a single power supply source to be provided, with which all power supply lines 19 through 21 are connected. This design will be adopted if a complete decoupling is unnecessary and all loads require the same power supply voltage. In the illustrated embodiment of the invention the power supply sources 26 through 28 may possess different power supply voltages.

For the control of the field bus stations the central station (not illustrated) transmits data telegrams by way of the field bus 11. Such telegrams each possess an address which is assigned to a certain field bus station 10. This field bus station then receives the data telegram and performs the commands contained therein. Such commands may involve the actuation, by way of the control outputs, of one or more relay coils 13 through 15 of the relay arrangement 12 in order to close the corresponding relay switches 16 through 18. If the power supply sources 26 through 28 are switched on such a closing then leads to the switching on of the respective load 22 through 24. For switching off switched on loads a further control command transmitted by way of the field bus 11 is then necessary, or a further possibility is for the field bus station 10 to comprise a timer arrangement and for the switch-on command to also comprise information about the time of switching on.

The number of relays in the relay arrangement 12 is naturally variable and for producing a compact design the relay arrangement 12 may also be integrated in the housing of the field bus station 10.

The relays of the relay arrangement 12 may for instance be in the form of reed relays or instead of the relay arrangement 12 it is possible for another arrangement of controlled switches, as for example opto-coupler switches to be employed.

By breaking the plug connection 25 reliable switching off of all loads is possible, independently of the control commands comprised in field bus station 10. Furthermore it is possible for switching off for safety to take place using an external power latching means, for instance by switching off one or more of the power supply sources 26 through 28.

What is claimed is:

1. A field bus arrangement comprising at least one field bus station adapted to be connected with a serial field bus, the field bus station capable of receiving instruction from the field bus and selectively generating a control output, and at least one load adapted to be controlled by way of the control output of the field bus station, wherein the at least one load is connected by way of a controlled switch with a power supply line provided in addition to lines of the field bus, wherein the power supply line is able to be switched on and switched off independently from the field bus station and the controlled switch is able to be selectively operated by the control output of the field bus station.

2. The field bus arrangement as set forth in claim 1, wherein a plurality of loads is arranged to be controlled by way of a corresponding number of controlled switches and of a corresponding number of control outputs of the field bus station.

3. The field bus arrangement as set forth in claim 2, comprising a plurality of power supply lines, arranged to be supplied with power, independently from each other, and connected with the controlled switches.

4. The field bus arrangement as set forth in claim 1, wherein a plurality of power supply lines are able to be switched independently of one another.

5. The field bus arrangement as set forth in claim 1, wherein the power supply line is connected with the loads by way of a disconnectable plug connection.

6. The field bus arrangement as set forth in claim 1, wherein the switch is designed in the form of a switching relay.

7. The field bus arrangement as set forth in claim 6, wherein said switching relay is a reed switch.

8. The field bus arrangement as set forth in claim 1, wherein the electrical switch is designed in the form of an opto-coupler switch.

9. The field bus arrangement as set forth in claim 1, wherein the switch is integrated in the housing of the field bus station.

10. The field bus arrangement as set forth in claim 1, wherein the at least one load includes a pneumatic valve.

11. A field bus arrangement comprising:
   at least one field bus station connectable to a serial field bus and capable of receiving instruction from the field bus and selectively generating a control signal;
   a controlled switch operatively connected to the field bus station, the switch being selectively actuatable between an open and closed state by the control signal generated by the field bus station, the controlled switch being operatively connected to a power source and to a load, such that when the controlled switch is actuated to the closed state, the power source is operatively connected to the load; and
   wherein the power source is electrically independent of the control signal, thereby allowing power to the load to be controlled by either the control signal generated by the field bus station or the electrically independent power source.

* * * * *